(12) United States Patent
Bencivenni et al.

(10) Patent No.: US 12,519,246 B2
(45) Date of Patent: Jan. 6, 2026

(54) ANTENNA ARRANGEMENT WITH A LOW-RIPPLE RADIATION PATTERN

(71) Applicant: Gapwaves AB, Gothenburg (SE)

(72) Inventors: Carlo Bencivenni, Gothenburg (SE); Julius Petersson, Gothenburg (SE)

(73) Assignee: Gapwaves AB, Gothenburg (SE)

( * ) Notice: Subject to any disclaimer, the term of this patent is extended or adjusted under 35 U.S.C. 154(b) by 118 days.

(21) Appl. No.: 17/786,890

(22) PCT Filed: Dec. 16, 2020

(86) PCT No.: PCT/EP2020/086394
§ 371 (c)(1),
(2) Date: Jun. 17, 2022

(87) PCT Pub. No.: WO2021/122725
PCT Pub. Date: Jun. 24, 2021

(65) Prior Publication Data
US 2023/0036066 A1 Feb. 2, 2023

(30) Foreign Application Priority Data

Dec. 20, 2019 (SE) .................................. 1930410-4
Jun. 23, 2020 (SE) .................................. 2030209-7

(51) Int. Cl.
*H01Q 21/00* (2006.01)
*G01S 13/931* (2020.01)
*H01Q 1/32* (2006.01)
*H01Q 17/00* (2006.01)

(52) U.S. Cl.
CPC ......... *H01Q 21/005* (2013.01); *G01S 13/931* (2013.01); *H01Q 1/3283* (2013.01); *H01Q 17/001* (2013.01); *G01S 2013/93275* (2020.01)

(58) Field of Classification Search
CPC combination set(s) only.
See application file for complete search history.

(56) References Cited

U.S. PATENT DOCUMENTS 3,119,109 A * 1/1964 Miller .................... H01Q 15/22
343/912
3,599,216 A 8/1971 Seaton
(Continued)

FOREIGN PATENT DOCUMENTS

| JP | H0490606 A | 3/1992 |
| JP | 2009-111463 A | 5/2009 |
| JP | 2017-175595 A | 9/2017 |
| WO | 2016073440 A1 | 5/2016 |
| WO | 2018001921 A1 | 1/2018 |

OTHER PUBLICATIONS

Huang, Cheng et al., "The Rectangular Waveguide Board Wall Slot Array Antenna Integrated with One Dimensional Subwavelength Periodic Corrugated Grooves and Artificially Soft Surface Structure", Journal Infrared Milli Terahz Waves, Dec. 20, 2008, pp. 357-366, vol. 30, No. 4, SS&BM (Year: 2008).*
(Continued)

*Primary Examiner* — Dimary S Lopez Cruz
*Assistant Examiner* — Brandon Sean Woods
(74) *Attorney, Agent, or Firm* — BUCHANAN INGERSOLL & ROONEY PC

(57) ABSTRACT

An antenna arrangement suitable for a vehicle radar transceiver. The antenna arrangement includes a radiating layer having a surface, the surface delimited by a surface boundary. One or more apertures are arranged on the surface. The antenna arrangement further includes one or more surface current suppressing members arranged on the surface. The one or more surface current suppressing members are arranged to suppress a surface current from an aperture to the surface boundary. The one or more surface current suppressing members include one or more grooves.

18 Claims, 9 Drawing Sheets

(56) References Cited

U.S. PATENT DOCUMENTS

| | | | |
|---|---|---|---|
| 6,933,881 B2 * | 8/2005 | Shinoda | H01Q 1/3233 |
| | | | 342/70 |
| 11,131,770 B2 * | 9/2021 | Park | H01Q 1/32 |
| 2016/0013557 A1 | 1/2016 | Kawaguchi et al. | |
| 2019/0379132 A1 * | 12/2019 | Pelletti | H01Q 9/0457 |

OTHER PUBLICATIONS

International Search Report (PCT/ISA/210) and Written Opinion (PCT/ISA/237) mailed on Mar. 30, 2021, by the European Patent Office as the International Searching Authority for International Application No. PCT/EP2020/086394. (13 pages).

Huang, Cheng et al., "The Rectangular Waveguide Board Wall Slot Array Antenna Integrated with One Dimensional Subwavelength Periodic Corrugated Grooves and Artificially Soft Surface Structure", Journal Infrared Milli Terahz Waves, Dec. 20, 2008, pp. 357-366, vol. 30, No. 4, Springer Science & Business Media LLC. (10 pages).

Office Action (Notice of Reasons for Rejection) issued on Aug. 6, 2024, by the Japanese Patent Office in corresponding Japanese Patent Application No. 2022-537523, and an English Translation of the Office Action. (23 pages).

Office Action (Notice of second review observations) issued on Nov. 30, 2024, by the State Intellectual Property Office in corresponding Chinese Patent Application No. 202080087254.5 and an English Translation of the Office Action. (30 pages).

* cited by examiner

ANTENNA ARRANGEMENT WITH A LOW-RIPPLE RADIATION PATTERN

TECHNICAL FIELD

The present disclosure relates to antenna arrangements for vehicle radar transceivers. There are disclosed antenna arrangements with improved radiation patterns.

BACKGROUND

Radar transceivers play an increasingly important role in modern vehicles. The radar transceivers may be used for autonomous driving or for providing the driver with useful information.

A radar works by transmitting a signal in a direction of interest through an antenna arrangement. The transmitted signal is thereafter reflected by an object in the direction of interest. Then, the reflected signal is received by the antenna arrangement and is processed. The processed reflected signal may give information about, e.g., the range of the object relative to the radar and the velocity of the object relative to the radar.

In some vehicular applications, the radiation pattern in the elevation dimension of the antenna arrangement should preferably comprise a single narrow beam. This can be accomplished by, e.g., an array of antenna elements. This way, the field of view in the elevation dimension may be substantially parallel to the ground. The radar may thereby avoid detecting uninteresting objects above the vehicle and it may also avoid unwanted ground reflections. The radiation pattern in the azimuth dimension of the antenna arrangement should, in the ideal case, be uniform over the field of view. The field of view in the azimuth dimension preferably has an angle as wide as possible, e.g., 180 degrees. Real antenna arrangements, however, present a trade-off between the azimuth beam width and a ripple in the azimuth radiation pattern. A narrow azimuth beam width with low ripple reduces the field of view. A wider beam width with larger ripple, on the other hand, transmits different amounts of power across the beam, which potentially complicates the signal processing.

There is a need for antenna arrangements with an improved radiation pattern.

SUMMARY

It is an object of the present disclosure to provide an improved antenna arrangement. The antenna arrangement is suitable for a vehicle radar transceiver. The antenna arrangement comprises a radiating layer having a surface, the surface delimited by a surface boundary. One or more apertures are arranged on the surface. The antenna arrangement further comprises one or more surface current suppressing members arranged on the surface. The one or more surface current suppressing members are arranged to suppress a surface current from an aperture to the surface boundary.

The surface currents scattered of the surface boundary and/or of neighboring slots give rise to unwanted radiation that disrupts the radiation pattern arising from the one or more slots. The surface current suppressing members suppress the surface currents and therefore reduce the unwanted radiation. Consequently, the surface current suppressing members improve the radiation pattern of the antenna arrangement in terms of lowering the ripple while maintaining a desired lobe width.

According to aspects, the one or more surface current suppressing members comprise one or more grooves. The grooves suppress surface currents by scattering the surface currents in a controlled fashion. A surface current that interacts with the groove is scattered as electromagnetic radiation, whereby its energy decreases and the current is suppressed. An advantage of a groove is that it may be manufactured in a similar way as the aperture in the radiating layer.

In an embodiment of the antenna arrangement, the one or more grooves and the one or more apertures are formed in a single layer, which is an advantage from a manufacturing point of view. In other words, the grooves and apertures are integrally formed on the same layer.

In an embodiment of the antenna arrangement, the grooves and the apertures are formed in a single material, e.g., metal, which is an advantage from a manufacturing point of view.

According to aspects, the one or more surface current suppressing members comprise one or more electromagnetic absorbers.

The electromagnetic absorbers suppress surface currents by attenuation. One advantage of using electromagnetic absorbers is that they may be arranged on the surface after the radiating layer has been manufactured.

According to aspects, at least one of the one or more electromagnetic absorbers is coated onto the surface. This provides an easy to manufacture and low-cost antenna arrangement.

According to aspects, at least one of the one or more electromagnetic absorbers is arranged in a recess formed in the surface. This way, it is possible to arrange the one or more electromagnetic absorbers flush with the surface. Such arrangement may save space, facilitate assembly, and may be used to avoid snagging of the electromagnetic absorbers during, e.g., antenna assembly.

According to aspects, the surface comprises a metalized coating on a supporting layer, and the one or more electromagnetic absorbers constitute part of the support layer. This way, the antenna arrangement may comprise a support layer with slot cutouts, wherein every surface except predetermined areas is metalized. The predetermined areas then constitute the electromagnetic absorbers. Such antenna arrangement would be easy to manufacture and have a low-cost.

According to aspects, the support layer comprises plastic. This way, the support layer would have a low cost and a low weight.

According to aspects, the support layer comprises a primer. This way, it is easier to metallize the support layer.

According to aspects, the one or more apertures are elongated slots.

This way, the radiating layer is cost-effective and high performing, in terms of, e.g., losses, and presents a desirable radiation pattern for, e.g., vehicle radars.

According to aspects, the one or more elongated slots extend in a first direction on the surface.

This way, the antenna arrangement can comprise an antenna array with, e.g., a narrow beam width in one dimension and a wide beam in another dimension.

According to aspects, at least one of the elongated slots extends in the first direction and at least one other of the elongated slots extends in a second direction on the surface. The second direction is different from, or even orthogonal to, the first direction.

This way, the antenna arrangement may be used for a dual polarized antenna arrangement, wherein the radiation pattern is improved for both polarizations.

According to aspects, the one or more surface current suppressing members comprise at least one elongated element having an elongation direction in the first direction. This way, one surface current suppressing member may suppress surface currents arising from several apertures extending in the first direction.

According to aspects, the one or more surface current suppressing members are arranged in connection to the surface boundary. This way, the surface current suppressing members may suppress surface currents arising from several apertures on the radiating layer.

According to aspects, the one or more surface current suppressing members are arranged in connection to the surface boundary and surround the one or more apertures. This way, the surface current suppressing members may improve the radiation pattern in the azimuth dimension for any orientation of the apertures on the surface, which is an advantage.

According to aspects, the antenna arrangement comprises a plurality of apertures, wherein at least one of the one or more surface current suppressing members is arranged between a first and second aperture in the plurality of apertures. This way, the surface current suppressing members may suppress surface currents intermediate apertures on the radiating layer.

According to aspects, the antenna arrangement comprises a plurality of apertures, wherein at least one of the apertures in the plurality of apertures is surrounded by the one or more surface current suppressing members. This way, the surface current suppressing members may suppress surface currents in all directions from the surrounded aperture.

According to aspects, the antenna arrangement comprises a frame, wherein the radiating layer is arranged to be received in the frame, and wherein the one or more surface current suppressing members are arranged on the frame.

This way, different configurations of radiating layers may fit into the same frame, thereby saving manufacturing costs. It is possible that the radiating layer comprises a plurality of radiating layer modules that are arranged to be received in the frame. The frame is a structural support for the one or more radiating layer modules, and the frame preferably comprises an electrically conductive material. The one or more radiating layer modules may be releasably attached to the frame for easy assembly, by, e.g., an interference fit or a snap fit.

According to aspects, a vehicle comprises the antenna arrangement.

According to aspects, a radar transceiver for a vehicle comprises the antenna arrangement.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

The present disclosure will now be described in more detail with reference to the appended drawings, where.

DETAILED DESCRIPTION

Figure 1A:
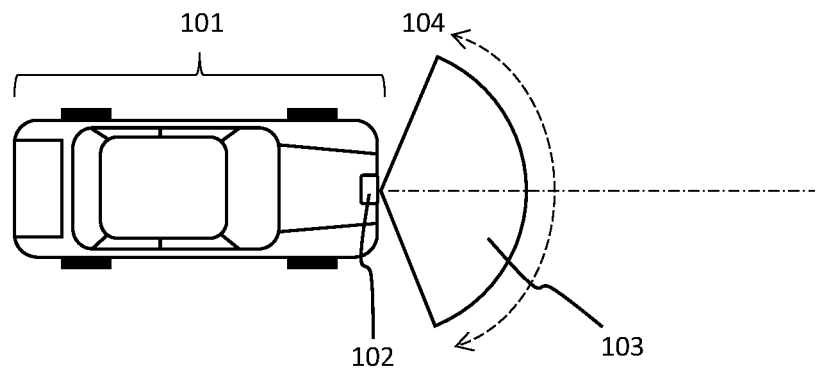
FIG. 1A shows a top view of a vehicle with a radar transceiver.

Aspects of the present disclosure will now be described more fully with reference to the accompanying drawings. The different devices and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

Figure 1B:
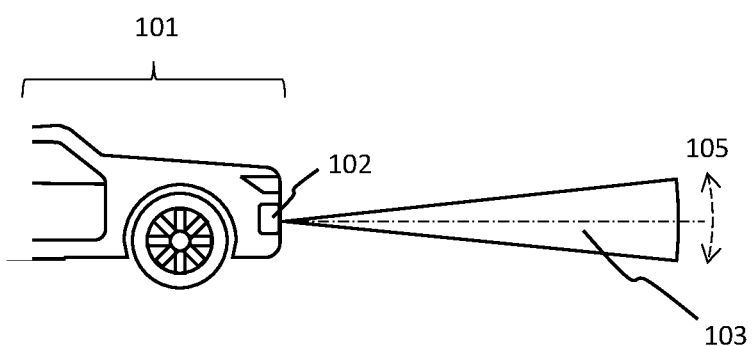
FIG. 1B shows a side view of a vehicle with a radar transceiver.

There are disclosed herein various types of antenna arrangements suitable for vehicle radar transceivers. FIGS. 1A and 1B schematically illustrate an example vehicle 101 comprising a radar transceiver 102. More specifically, FIG. 1A shows a top view of the vehicle, wherein the radar transceiver is arranged on the front of the vehicle. FIG. 1A also shows a radiation pattern 103 of the radar transceiver in the azimuth dimension 104. The radiation pattern, or antenna pattern, or far-field pattern, is the angular dependent strength of the electromagnetic radiation from an antenna arrangement in the radar transceiver. If an antenna arrangement radiates equally in a span of angles (e.g. 180 degrees) in an angular dimension (e.g. azimuth), the radiation pattern is uniform in that span. If, on the other hand, the antenna arrangement is directive, the highest radiated power is contained in a main lobe. A main lobe has an angular width in degrees, which may be specified by the half power beam width, HPBW, which is the angular span between two angular points where the radiated power is half of its maximum value. FIG. 1B shows a side view of the vehicle and the radiation pattern 103 of the antenna arrangement in the elevation dimension 105. It is appreciated that the radar transceiver can be placed on other locations on the vehicle, such as on the sides or in a rearward facing position. Furthermore, it is appreciated that the disclosed antenna arrangements may be used for other radar transceivers than vehicle radar transceivers, or for other radio frequency applications, such as communication systems, positioning systems etc.

The herein disclosed antenna arrangements have the ability of presenting a radiation pattern with a main lobe that is narrow in the elevation dimension and that is wide with a low ripple in the azimuth dimension. Such pattern allows for the detection of objects in a direction substantially parallel to the ground, in a wide angle from the vehicle, while simultaneously avoiding undesired ground reflections and undesired detection above the vehicle. For a vehicle radar transceiver, a narrow main lobe in the elevation dimension may, e.g., be a pattern which covers an angular span of up to 40 degrees, and preferably 15 degrees. The azimuth dimension main lobe width for a vehicle radar transceiver may be on the order of 180 degrees.

A ripple in the main lobe is a variation of the radiation power versus the angle (in e.g. the azimuth dimension) within the main lobe. If the amplitude of the ripple is larger than half of the maximum radiated power, the radiation pattern will no longer comprise a single main lobe. The ripple may be periodic or aperiodic versus the angle.

Figure 2:
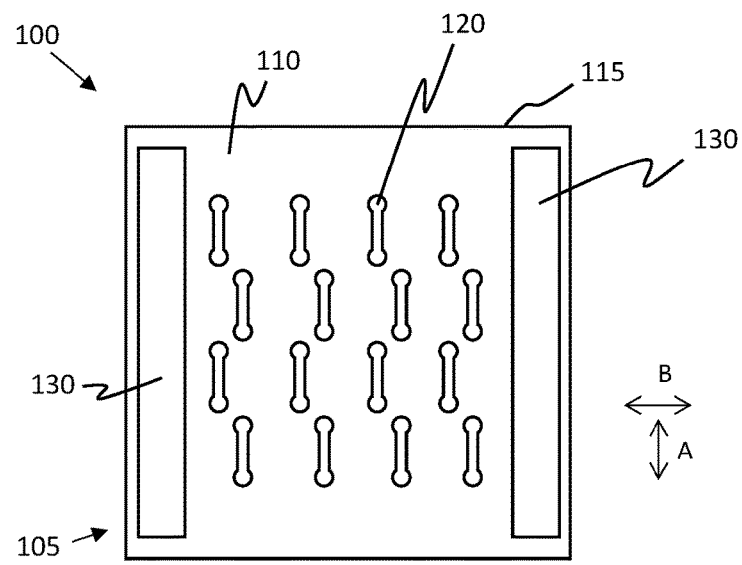
FIG. 2 schematically illustrates an example antenna arrangement.

FIG. 2 shows an antenna arrangement comprising slot antennas arranged in an antenna array. The antenna arrangement comprises a radiating layer 105 having a surface 110. The surface is delimited by a surface boundary 115. The radiating layer has two faces and is associated with a thickness. The thickness is much smaller than the dimension of the faces. A slot antenna normally comprises an electrically conductive surface with a cut out portion, i.e., a slot. The conductive surface acts as a ground plane. The conductive surface comprises a good electrical conductor, e.g., copper. The slot is normally substantially rectangular, where the first sides have a length corresponding a half of the wavelength of the intended radio frequency signal and the second sides have a length substantially shorter than the first sides, e.g., a tenth of the length of the first sides. The corners may be rounded for an improved bandwidth of the slot antenna. The bandwidth is the frequency span which the antenna can transmit and/or receive radio frequency signals. For further bandwidth improvements, the slot aperture can have a dumbbell shape, i.e., the two short sides have oval shapes. Other slot aperture shapes that are substantially rectangular are also possible.

It should be noted that the disclosed antenna arrangement may comprise any aperture. Thus, the one or more apertures 120 are optionally elongated slots in the disclosed antenna arrangement 100. For readability, however, the non-limiting example of the one or more apertures being elongated slots is used throughout the Detailed Description.

A plurality of slot antennas can form an array. For example, a plurality of vertically elongated slots may be stacked vertically. In such vertical stack, the slots may be arranged in a glide symmetry fashion for a small vertical distance between the slots. The glide symmetry in FIG. 2 comprises arranging every second slot in the vertical stack in a horizontal translation (along direction B), thereby having a vertical symmetry line (along direction A). The plurality of vertically elongated slot antennas may also be arranged horizontally for a horizontal array. A combination of horizontal and vertical arrangements of the slots is also possible.

Figure 3:
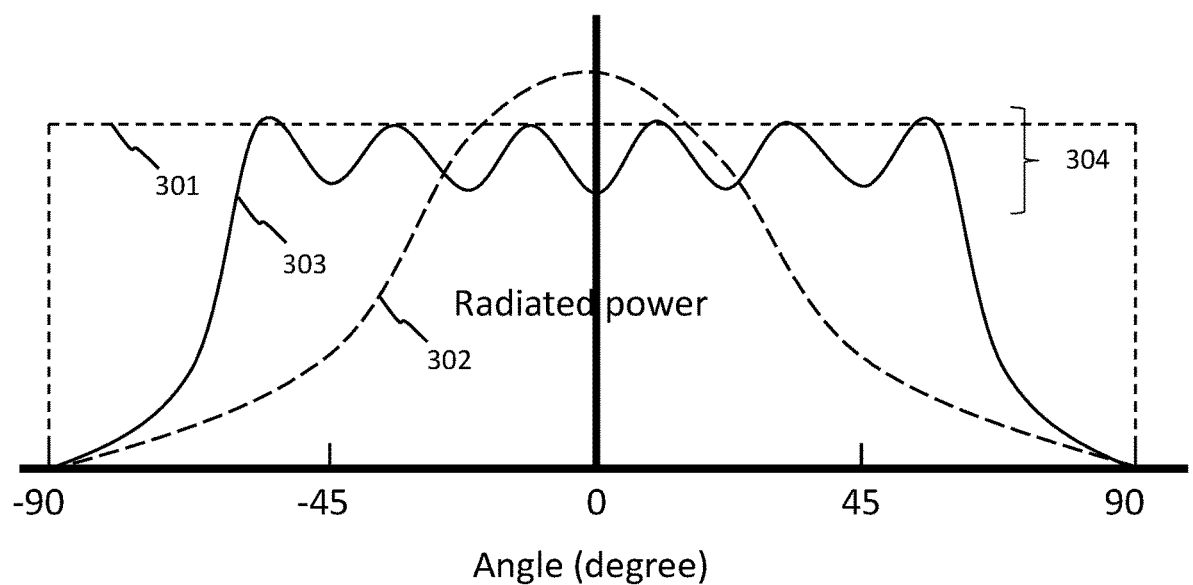
FIG. 3 illustrates example radiation patterns.

FIG. 3 shows radiation patterns in the azimuth dimension for different slot antenna arrangements, wherein the slots are oriented such that they are elongated vertically (in direction A of FIG. 2). An ideal slot antenna with an infinite ground plane presents a perfectly uniform radiation pattern 301 over span of 180 degrees in the azimuth dimension. However, due to a finite ground plane, a real conventional slot antenna presents a ripple 304 in the radiation pattern 303 in the azimuth dimension. This ripple may be reduced at the cost of making the beam narrower, as in 302. The finite ground plane results in surface currents being scattered at ground plane edges and/or at any neighboring slots. Here, the surface currents arise from the slot apertures. In other words, discontinuities in the ground plane give rise to the scattering. If the ground-plane were infinitely large, there would be no scattered surface currents arising from the ground plane edges. The scattered surface currents cause unwanted radiation from the antenna arrangement, which disrupts the radiation pattern arising from the slot aperture.

FIG. 2 illustrates an example antenna arrangement of the present disclosure. More detailed views and various embodiments of the disclosed antenna arrangement are shown in FIGS. 4A-12D. The disclosed antenna arrangement 100 comprises a radiating layer 105 having a surface 110, the surface 110 delimited by a surface boundary 115. One or more apertures 120 are arranged on the surface. The antenna arrangement further comprises one or more surface current suppressing members 130 arranged on the surface 110, wherein the one or more surface current suppressing members are arranged to suppress a surface current from an aperture 120 to the surface boundary 115. The surface currents scattered at the surface boundary 115 and/or at any neighboring slots give rise to unwanted radiation that disrupts the radiation pattern arising from the one or more slots. The surface current suppressing members suppress the surface currents and therefore reduce the unwanted radiation. Consequently, the surface current suppressing members improve the radiation pattern of the antenna arrangement in terms of lowering the ripple while maintaining a wide main lobe. The radiation pattern of the disclosed antenna arrangement is therefore more uniform and resembles the flat radiation pattern 301 in FIG. 3.

The surface 110 of the radiating layer 105 is electrically conductive. However, it is appreciated that a plastic film, or such, may cover the radiating layer. Thus, an outer surface of the antenna arrangement 100 is not necessarily electrically conductive. Thus, in an example embodiment, the radiating layer comprises a metalized plastic. Then, either or both faces of the plastic layer can be metalized, i.e., a metallization can constitute the surface 110.

Figure 9:
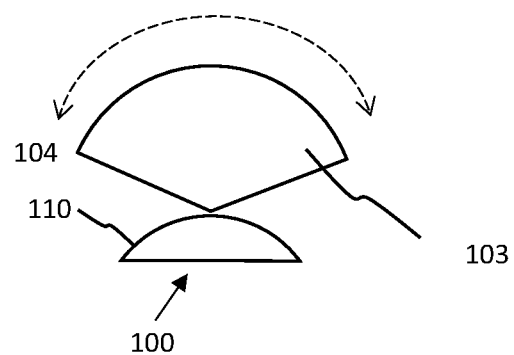
FIG. 9 schematically illustrates an example antenna arrangement.
Figure 10A:
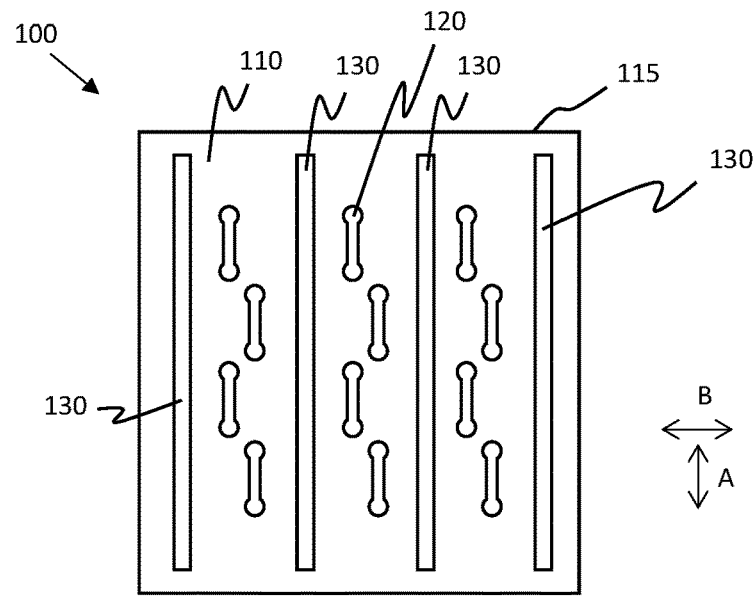
FIGS. 10A, 10B, and 10C illustrate example antenna arrangements with different configurations of surface current suppressing members.
Figure 10B:
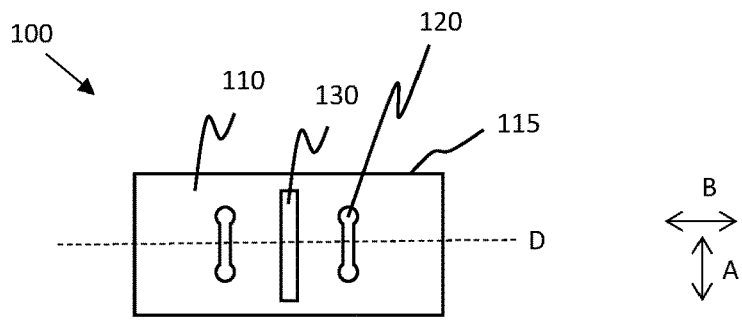
Figure 10C:
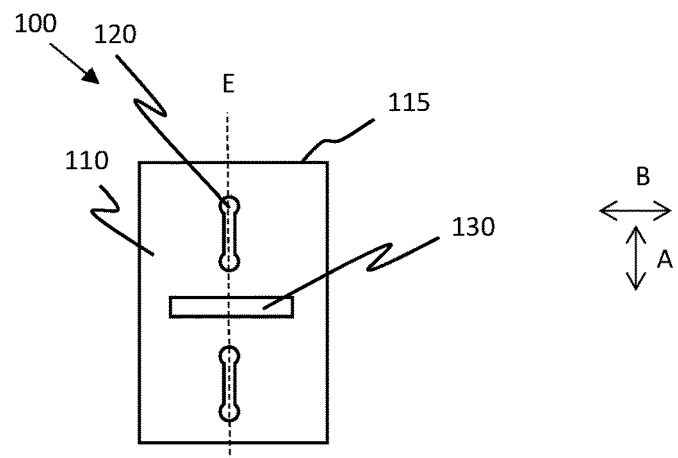

The surface 110 is not necessarily a planar surface. It is appreciated that other surface shapes are possible, such as surfaces having an arcuate form in one or two dimensions, as in, e.g., conformal antennas. FIG. 9 illustrates an example antenna arrangement wherein the surface has an arcuate form. The surface boundary may, for example, be rectangular, circular, or any other closed formed shape.

The antenna arrangement 100 may comprise one or more elongated slots 120 extending in a first direction A on the surface 110. The one or more elongated slots extending in the direction A may, for example, form an array in the direction A and/or in a direction perpendicular to the direction A.

Figure 7:
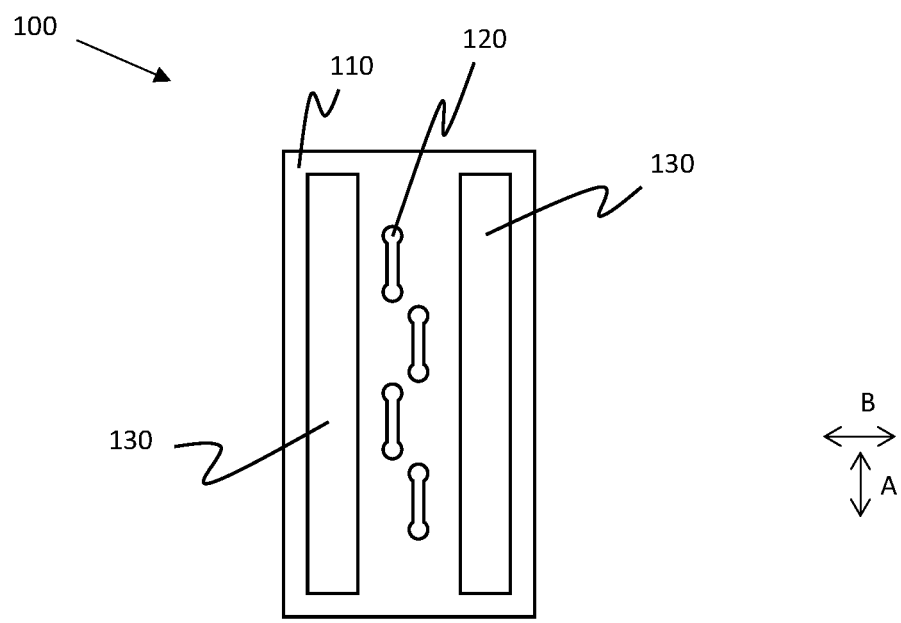
FIG. 7 schematically illustrates an example antenna arrangement.

FIG. 2 shows an example antenna arrangement 100 wherein a plurality of elongated slots 120 extend in the direction A. Two surface current suppressing members, also extending in the direction A, are arranged at respective sides of the surface 110, the sides extending in the direction A. In this example antenna arrangement, the two surface current suppressing members improve the radiation pattern in the azimuth dimension for all slot antennas, since the surface current suppressing members suppress surface currents from the slots to the surface boundaries extending in the direction A, and thereby reduces unwanted scattering of the surface currents. Thus, according to some aspects, the one or more surface current suppressing members 130 comprise at least one elongated element having an elongation direction in the first direction A. FIG. 7 shows a similar antenna arrangement with an array in the first direction A.

Figure 6:
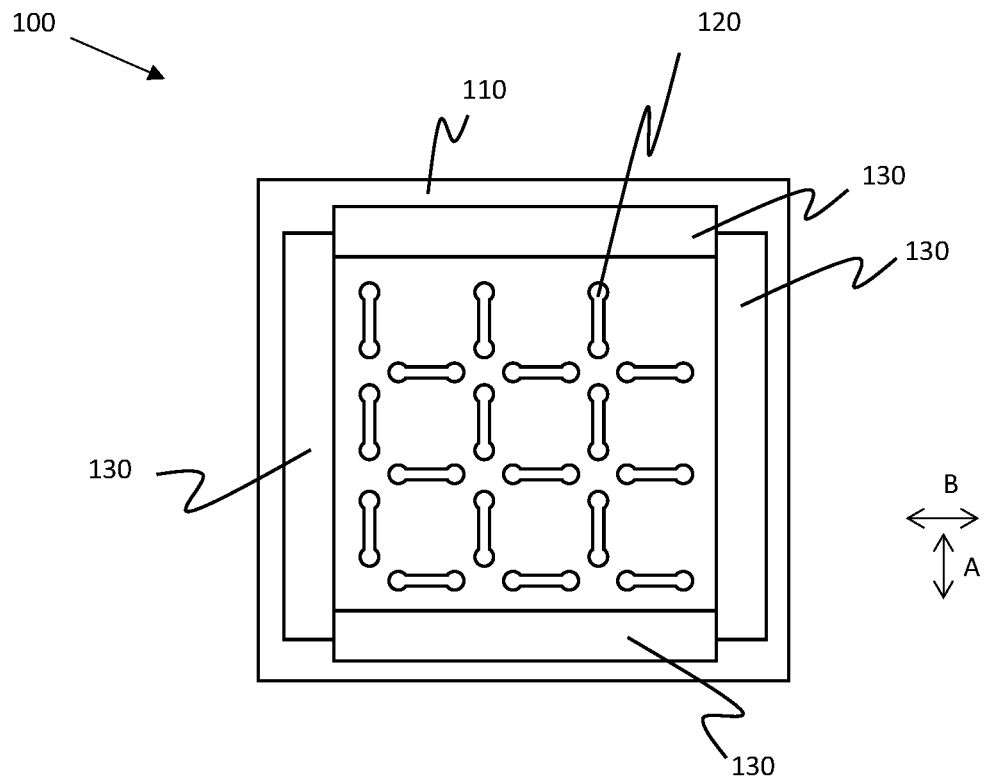
FIG. 6 schematically illustrates an example antenna arrangement with dual polarizations.

FIG. 6 shows an example antenna arrangement 100 wherein at least one of the elongated slots 120 extends in the first direction A and at least one other of the elongated slots extends in a second direction B on the surface 110. The second direction B is different from, or even orthogonal to, the first direction A. Such slot arrangements may be used for a dual polarized antenna arrangement, wherein the radiation pattern is improved for both polarizations, since surface current suppressing members suppress unwanted radiation from scattered surfaces currents on all sides of the surface 110.

Figure 4A:
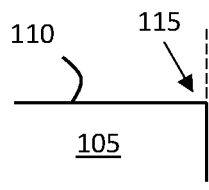
FIGS. 4A and 4B show side views of example antenna arrangements.
Figure 4B:
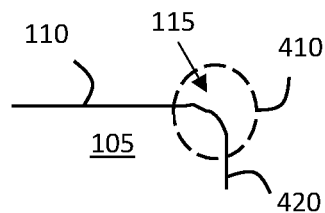

In the example antenna arrangements 100 in FIGS. 2,5A, 5B,5C,6,7, and 8, the one or more surface current suppressing members 130 are arranged in connection to the surface boundary 115. FIGS. 4A and 4B show details of example surface boundaries 115. In FIG. 4A, the surface boundary comprises a 90-degree corner. As such, the surface current suppressing members is arranged in connection to the corner. In FIG. 4B, the surface boundary comprises a rounded corner. As such, the surface current suppressing members is arranged in the vicinity 410 of the corner. It is appreciated that other shapes of the surface boundary are possible. It is also appreciated that the surface current suppressing member may extend over the surface boundary, thereby the surface current suppressing member may partly be arranged on the surface 110 and partly on an adjacent surface 420. The adjacent surface may be arranged, for example, 90 degrees relative to the surface 110, although other angles are also possible.

In the example embodiment of the antenna arrangement in FIG. 6, the one or more surface current suppressing members 130 are arranged in connection to the surface boundary 115 and surround the one or more apertures 120. Here, to surround means to form a perimeter around the surrounded object, as shown in FIG. 6. It is, however, appreciated that small gaps can be formed in the perimeter without loss of function. In this type of configuration, the surface current suppressing members may improve the radiation pattern in the azimuth dimension for any orientation of the slots on the surface 110, which is an advantage.

In the example embodiment of the antenna arrangements in FIGS. 10A,10B,10C, and 12A, where each antenna arrangement comprises a plurality of apertures 120, at least one of the one or more surface current suppressing members 130 is arranged between a first and second aperture in the plurality of apertures. Arranged between here means to be located on a straight line drawn between two adjacent slots, see, e.g., line D in FIG. 10B or line E in FIG. 10C.

Figure 11:
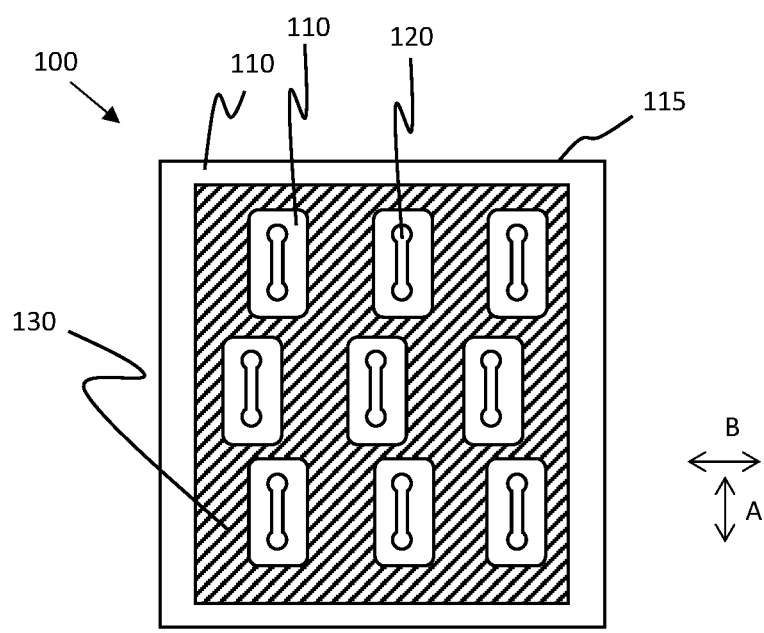
FIG. 11 schematically illustrates an example antenna arrangement.

In the example embodiment of the antenna arrangement in FIG. 11, which comprises a plurality of apertures 120, at least one of the apertures in the plurality of apertures is surrounded by the one or more surface current suppressing members.

In the disclosed antenna arrangement 100, the one or more surface current suppressing members 130 may comprise one or more electromagnetic absorbers. The electromagnetic absorbers suppress surface currents by attenuation. An electromagnetic absorber generally comprises lossy materials that attenuate transmission or reflection of electromagnetic radiation. As such, an electromagnetic absorber should be neither a good electrical isolator (as in, e.g., rubber) nor a good electrical conductor (as in, e.g., copper). An example of an electromagnetic absorber is a foam material loaded with iron and/or carbon. Electromagnetic absorbers can be resonant, i.e., a particular frequency is attenuated (e.g. 30 GHz), or broadband, i.e., a span of frequencies is attenuated (e.g. 1 GHz to 40 GHz). The attenuation of electromagnetic radiation in a direction is dependent on the thickness of the electromagnetic absorber in the same direction. One example of attenuation per length is 10 dB/cm at 2 GHz. Another example is 150 dB/cm at 30 GHz. These two examples of attenuation per length could be applicable to the disclosed antenna arrangement 100.

Figure 5A:
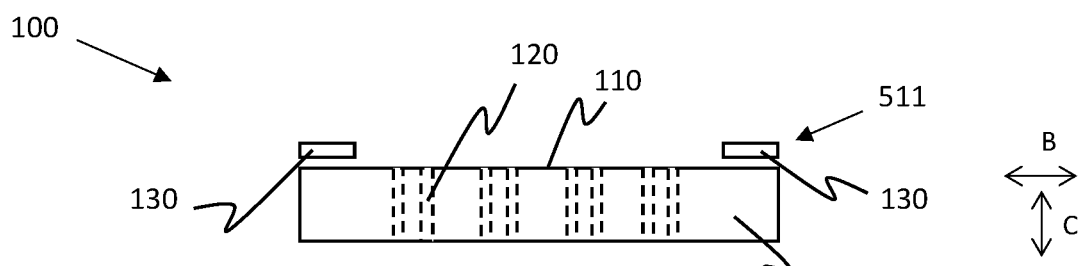
FIGS. 5A, 5B, and 5C illustrate example antenna arrangements with different configurations of surface current suppressing members.

FIG. 5A illustrates a side view of an example antenna arrangement 100 wherein the one or more electromagnetic absorbers are arranged on top of the surface 110. Note that the height (extending in direction C in FIG. 5A) of the radiating layer 105 is not necessarily to scale compared to the rest of the figure. At least one of the one or more electromagnetic absorbers 130 may be coated 511 onto the surface 110 for a quick and cost-effective manufacturing process. The coating may comprise spraying an electromagnetic absorbing material onto the surface 110. Furthermore, the one or more electromagnetic absorbers 130 may be attached to the surface 110 by an adhesive.

Figure 5B:
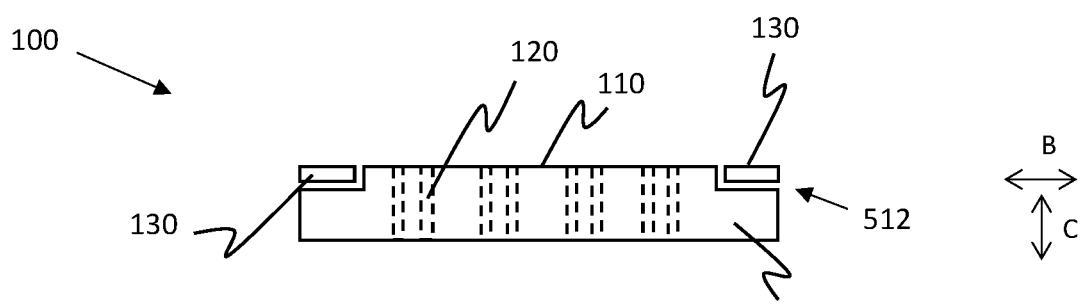

FIG. 5B illustrates a side view of an example antenna arrangement 100 wherein at least one of the one or more electromagnetic absorbers 130 is arranged in a recess 512 formed in the surface 110. Note that the height (extending in direction C in FIG. 5B) of the radiating layer 105 is not necessarily to scale compared to the rest of the figure. Thereby, it is possible to arrange the one or more electromagnetic absorbers flush with the surface 110. Such arrangement may save space, facilitate assembly, and may be used to avoid snagging of the electromagnetic absorbers during, e.g., antenna assembly.

Figure 5C:
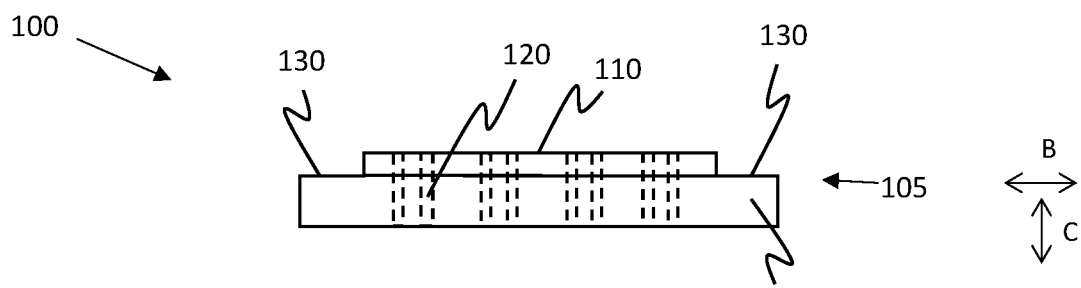

FIG. 5C illustrates a side view of an example antenna arrangement 100 wherein the surface 110 comprises a metalized coating on a support layer 510, and the one or more electromagnetic absorbers 130 constitute part of the support layer. The radiating layer thus comprises the support layer and the metallization. Note that the height (extending in direction C in FIG. 5C) of the radiating layer 105 is not necessarily to scale compared to the rest of the figure. On the support layer, the side opposite of the surface 100 may also be metalized. Preferably, the insides of the slots are also metalized. In other words, the antenna arrangement may comprise a support layer with slot cutouts, wherein every surface except predetermined areas is metalized. The predetermined areas then constitute the electromagnetic absorbers 130. The predetermined areas could for example be covered with a removable film when the support layer is metalized.

In an example embodiment of the disclosed antenna arrangement, the support layer comprises a plastic, wherein the plastic has electromagnetic absorbing properties at the frequency band of operation of the antenna arrangement.

Metallization of plastics can be done in two steps, wherein a primer is first applied onto a plastic surface before the plastic surface is coated with a desirable metal. In the present disclosure, desirable metals for the metallization of plastics have low loss and high electrical conductivity, e.g., copper, silver, and gold. Many other metals and alloys are also possible. Examples of suitable primers are nickel, chromium, palladium, and titanium, although many other materials are also possible. Therefore, in another example embodiment of the disclosed antenna arrangement, areas coated only with the primer comprise the electromagnetic absorbers 130, i.e., the support layer comprises a primer. In other words, the antenna arrangement may comprise a plastic layer with slot cutouts, wherein every surface is coated with a primer. Thereafter, every area except predetermined areas is metalized. The predetermined areas constitute the electromagnetic absorbers 130.

FIGS. 12A, 12B, 12C and 12D show example antenna arrangements 100. Here the one or more surface current suppressing members 130 comprise one or more grooves. The grooves suppress surface currents by scattering the surface currents in a controlled fashion. A surface current that interacts with the groove is scattered as electromagnetic radiation, whereby its energy decreases and the current is suppressed. Surface currents, arising from the one or more slots, that are scattered at the surface boundary 115 and/or at any neighboring slots degrade the radiation pattern of the antenna arrangement 100. By scattering the surface current in a controlled fashion, the desired radiation pattern can be maintained. The insides of the grooves are preferably electrically conductive.

Figure 12A:
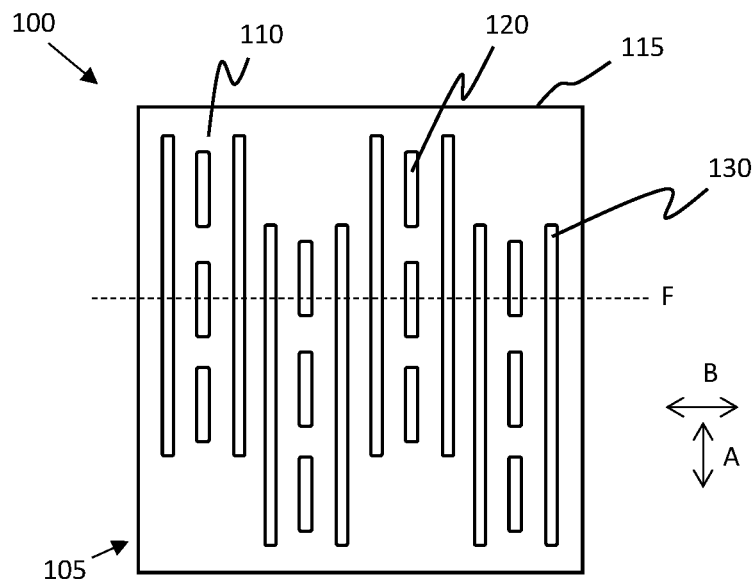
FIGS. 12A, 12B, 12C, and 12D illustrate example antenna arrangements with different configurations of surface current suppressing members.
Figure 12B:
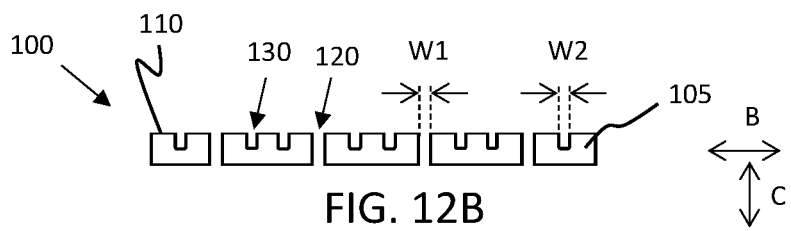
Figure 12C:
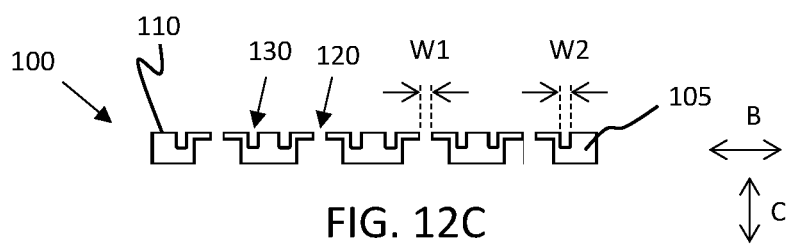
Figure 12D:
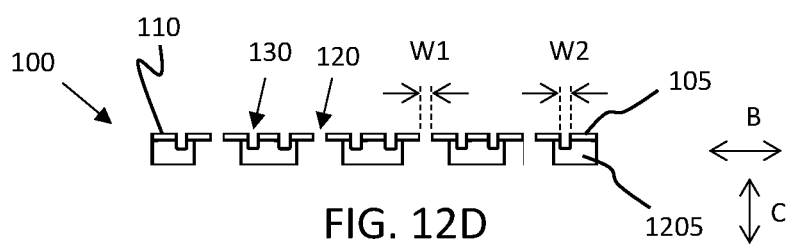

FIGS. 12B, 12C, and 12D show different embodiments of the antenna arrangement, viewed along cross section F in FIG. 12A. Note that the height (extending in direction C in the figures) is not necessarily to scale compared to the rest of the figures. In FIGS. 12B and 12C, the slots 120 are cutouts penetrating through the surface 110 and provides passages, whereas the grooves are recesses that do not provide passages. FIG. 12B illustrates that the grooves may be shallower than the slots; FIGS. 12C and 12D illustrate that the slots may be more or equally shallow compared to the grooves. In other words, the thickness (in direction C in the figures) radiating layer surrounding the groove can be larger compared to the thickness surrounding the slots. FIG. 12D shows an embodiment wherein the one or more grooves comprise two layers. More specifically, the grooves penetrate through the radiating layer 105 and extends into a support layer 1205. The continuation of the groove in the support layer 1205 does not necessarily size match the part of the groove opening in the radiating layer. For example, the continuation may be wider. The purpose of the support layer is to seal the grooves shut. The support layer is preferably electrically conductive. The support layer may or may not be an integral part of an optional distribution layer. Commonly in antenna arrangements, there is a distribution layer facing the surface of the radiating layer not intended to radiate. The distribution layer distributes radio frequency signals to and from the slots in the radiating layer.

Optionally, the one or more grooves 130 are elongated grooves with a second width W2 matching a first width W1 of one of the elongated slots 120. The elongated slot has a length in the elongation direction (A in FIG. 12A) and width W1, wherein the width is transverse to the elongation direction (W1 extends in direction B in FIGS. 12A and 12B). The groove has a length in the elongation direction and a width W2, wherein the width W2 is measured orthogonally to the elongation direction. As shown in FIG. 12A, the length of the groove can be substantially longer than the width. It can further be seen that the length of the groove matches the extension of the slots. According to aspects, a plurality of grooves is arranged adjacent to a slot. It is also possible to arrange grooves asymmetrically on an array antenna, i.e., different apertures on the array will be affected differently from the grooves. This may be useful if it is desired to shape an asymmetrical beam.

Figure 13:
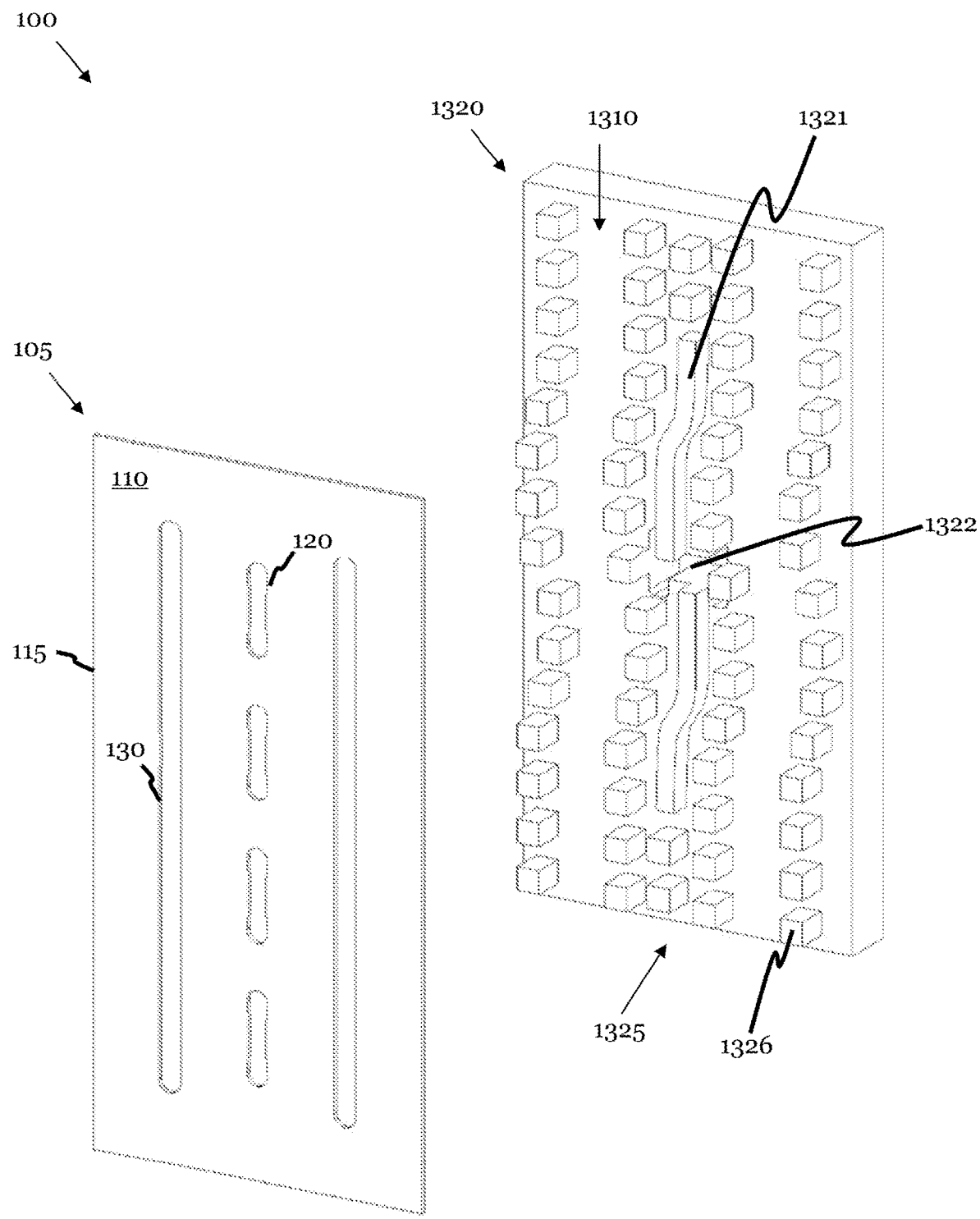
FIG. 13 schematically illustrates an example antenna arrangement.

The antenna arrangement 100 may optionally comprise a distribution layer 1320 with transmission lines based on gap waveguide technology. An example of such antenna arrangement is shown in FIG. 13. The transmission line is used for conveying radio frequency signals. A transmission line based on gap waveguide technology is generally built up of two parts; a metamaterial structure surface 1325 and a flat metal surface being placed in close proximity to one another, but not necessarily in direct contact. The metamaterial structure surface may for example comprise repetitive conductive pins 1326 or repetitive conductive cavities. A metamaterial structure surface sometimes referred to as an artificial magnetic conductor. The metamaterial structure creates a barrier preventing the electromagnetic waves from propagating in undesired directions. In this way, the metamaterial structure replaces two walls in rectangular waveguides. This is done without requiring a perfectly sealed metallic enclosure, which is an advantage.

As mentioned, the grooves are recesses that do not provide electromagnetic passages. Furthermore, the one or more grooves may comprise two layers. More specifically, the grooves can penetrate through the radiating layer 105 and extend into a distribution layer 1320. The purpose of the connected part of the distribution layer 1320 is to seal the grooves shut. Thereby, a groove is still a recess that does not provide passage. In other words, the one or more grooves are through holes in the radiation layer and are electromagnetically terminated in the distribution layer. Terminated means that electromagnetic radiation cannot propagation into a grove and then pass, i.e., the groove can be seen as a one-port network.

FIG. 13 shows example surface current suppressing members 130 comprising grooves penetrating through the radiating layer 105 and extending into the distribution layer 1320. Here, the extensions into the distribution layer are mostly surrounded by electrically conductive protrusions 1326 constituting an EBG structure 1325. The EBG structure prevents electromagnetic coupling along the surface of the EBG structure. Thereby, the EBG structures arranged adjacent to the extended grooves effectively seal the grooves shut. In FIG. 13, it can be noted that protrusions are not present at each end 1310 of the grooves. This is possible since there are not any electrical fields at those locations that need to be contained functionality wise in this particular example arrangement. In other words, the extended groove is still sealed shut. However, protrusions may optionally be placed in those locations for other purposes, e.g., mechanical and shielding. It also possible to shield the grooves shut without EBS structures, e.g., by arranging a normal waveguide cavity in the distribution layer. In FIGS. 12D and 13, the grooves are electromagnetically isolated from the slots below the radiation layer, i.e., the direction where the radiation layer faces the support/distribution layer.

Figure 8:
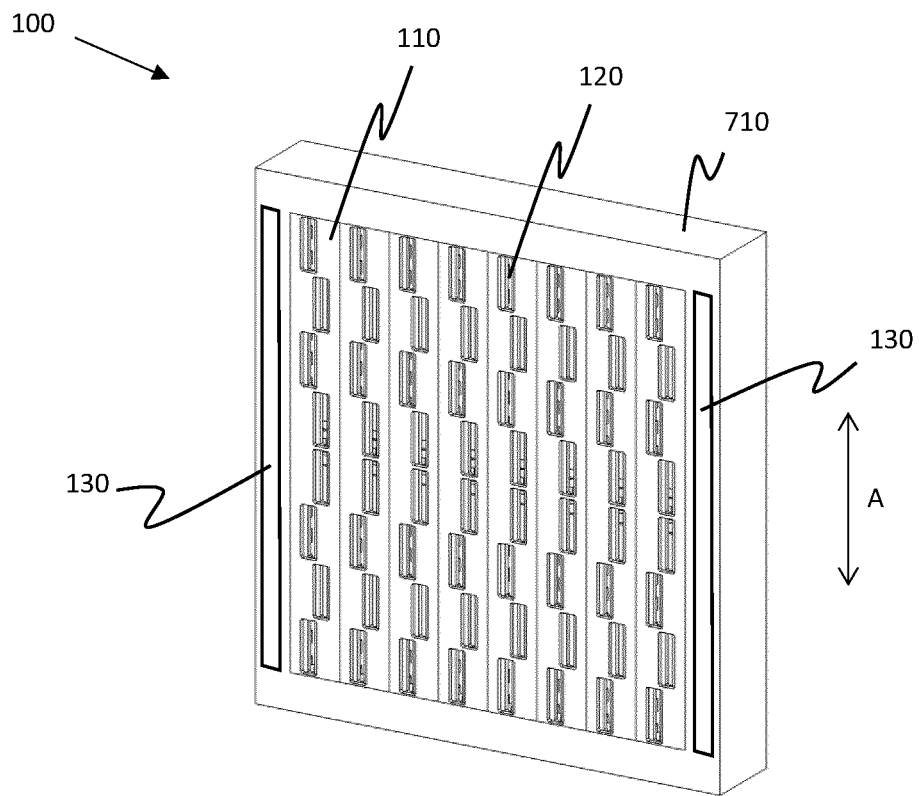
FIG. 8 schematically illustrates an example antenna arrangement comprising a frame.

FIG. 8 shows an example antenna arrangement 100 comprising a frame 710, wherein the radiating layer 105 is received in the frame, and wherein the one or more surface current suppressing members 130 are arranged on the frame. This way, different configurations of radiating layers may fit into the same frame, thereby saving manufacturing costs. It is possible that the radiating layer comprises a plurality of radiating layer modules that are arranged to be received in the frame. The frame is a structural support for the one or more radiating layer modules, and the frame preferably comprises an electrically conductive material. The one or more radiating layer modules may be releasably attached to the frame for easy assembly, by, e.g., an interference fit or a snap fit.

According to some aspects, a vehicle 101 comprises the antenna arrangement 100.

According to some aspects, a radar transceiver 102, for a vehicle, comprises the antenna arrangement 100.

The invention claimed is:

1. An antenna arrangement, the antenna arrangement comprising:
a radiating layer having a surface, the surface delimited by a surface boundary;
one or more apertures arranged on the surface; and
one or more surface current suppressing members arranged on the surface, wherein the one or more surface current suppressing members are arranged to suppress a surface current from an aperture to the surface boundary, wherein the one or more surface current suppressing members comprise one or more grooves, wherein the antenna arrangement further comprises a distribution layer, wherein the one or more grooves are through holes in the radiation layer and are electromagnetically terminated in the distribution layer.

2. The antenna arrangement according to claim 1, wherein the one or more grooves and the one or more apertures are formed in a single layer.

3. The antenna arrangement according to claim 1, wherein the one or more apertures are elongated slots.

4. The antenna arrangement according to claim 1, wherein at least one of the elongated slots extends in a first direction (A) and at least one other of the elongated slots extends in a second direction (B) on the surface, where the second direction (B) is different from the first direction (A).

5. The antenna arrangement according to claim 1, wherein the one or more surface current suppressing members comprise at least one elongated element having an elongation direction in a first direction (A).

6. The antenna arrangement according to claim 1, wherein the one or more surface current suppressing members are arranged in connection to the surface boundary.

7. The antenna arrangement according to claim 1, wherein the one or more surface current suppressing members are arranged in connection to the surface boundary and surround the one or more apertures.

8. The antenna arrangement according to claim 1, comprising a plurality of apertures, wherein at least one of the one or more surface current suppressing members is arranged between a first and second aperture in the plurality of apertures.

9. The antenna arrangement according to claim 1, comprising a plurality of apertures, wherein at least one of the apertures in the plurality of apertures is surrounded by the one or more surface current suppressing members.

10. The antenna arrangement according to claim 1, comprising a frame, wherein the radiating layer is arranged to be received in the frame, and wherein the one or more surface current suppressing members are arranged on the frame.

11. A vehicle comprising the antenna arrangement according to claim 1.

12. An antenna arrangement, the antenna arrangement comprising:
a radiating layer having a surface, the surface delimited by a surface boundary;
one or more antenna apertures arranged on the surface; and
one or more surface current suppressing members arranged on the surface, wherein the one or more surface current suppressing members are arranged to suppress a surface current from an aperture to the surface boundary, wherein the one or more surface current suppressing members comprise one or more electromagnetic absorbers, wherein the radiating layer comprises a metallized coating on a supporting layer, and the one or more electromagnetic absorbers constitute part of the support layer, wherein every area except predetermined areas of the support layer is metallized and wherein the predetermined areas form the electromagnetic absorbers, wherein the radiating layer comprises slot cutouts extending through the metallized coating and the supporting layer, wherein the slot cutouts form the one or more antenna apertures, and wherein an inside of the slot cutouts is metallized.

13. The antenna arrangement according to claim 12, wherein the one or more apertures are elongated slots.

14. The antenna arrangement according to claim 12, wherein the one or more surface current suppressing members are arranged in connection to the surface boundary.

15. The antenna arrangement according to claim 12, comprising a plurality of apertures, wherein at least one of the one or more surface current suppressing members is arranged between a first and second aperture in the plurality of apertures.

16. The antenna arrangement according to claim 12, wherein at least one of the one or more electromagnetic absorbers is coated onto the surface.

17. The antenna arrangement according to claim 12, wherein at least one of the one or more electromagnetic absorbers is arranged in a recess formed in the surface.

18. The antenna arrangement according to claim 12, wherein the supporting layer comprises a plastic, wherein the plastic has electromagnetic absorbing properties at the frequency band of operation of the antenna arrangement.

* * * * *